United States Patent [19]
Okamoto et al.

[11] 3,962,932
[45] June 15, 1976

[54] REACTION MOMENT BALANCING DEVICE FOR AN ENGINE

[75] Inventors: Yoshinori Okamoto; Takamasa Onda, both of Kawagoe, Japan

[73] Assignee: Honda Giken Kogyo Kabushiki Kaisha, Tokyo, Japan

[22] Filed: Sept. 3, 1975

[21] Appl. No.: 610,080

[30] Foreign Application Priority Data
Sept. 10, 1974 Japan .............................. 49-103455

[52] U.S. Cl. .................................. 74/604; 74/443; 123/192 B
[51] Int. Cl.² .................. F16H 21/22; F16H 55/14; F02B 75/06
[58] Field of Search ........... 123/192 B; 74/604, 603, 74/440, 443

[56] References Cited
UNITED STATES PATENTS

| | | |
|---|---|---|
| 3,667,317 | 6/1972 | Hillingrathner ............ 123/192 B X |
| 3,710,774 | 1/1973 | Weslon et al. ................. 123/192 B |
| 3,744,342 | 7/1973 | Kinoshita .................... 123/192 B X |

*Primary Examiner*—Leonard H. Gerin
*Attorney, Agent, or Firm*—Haseltine, Lake & Waters

[57] ABSTRACT

Reaction moment, acting upon the crankcase of a conventional engine when the crankshaft is accelerated or decelerated, is minimized by the provision of a balance shaft carrying a weighted mass and arranged in parallel with the crankshaft and transmission means including a pair of intermeshing gears of an appropriate gear ratio mounted on the two parallel shafts. One of the gears in mesh is divided in two gear sections which is resiliently connected to the associated shaft normally to have an appropriate amount of phase shift therebetween to eliminate backlash.

4 Claims, 3 Drawing Figures

3,962,932

REACTION MOMENT BALANCING DEVICE FOR AN ENGINE

BACKGROUND OF THE INVENTION

This invention relates to balancing devices for use on an engine to eliminate or minimize the reaction moment occurring with change in rotation speed of the engine crankshaft.

In general, when an engine crankshaft is accelerated or decelerated, the crankcase, rotably supporting the crankshaft, is subjected to a rotational moment or torque as a reaction to the change in speed of the crankshaft. Obviously, such reaction moment acts as a rocking moment upon the crankcase and associated support structure and is liable to cause engine oscillation. Particularly, with the case of motorcycles, usually carrying an engine with its crankshaft arranged in the fore and aft direction of the body of the motorcycle, such reaction moment acts on the cycle body to cause lateral oscillation thereof and involves difficulties such as loss of stability in running attitude of the cycle.

SUMMARY OF THE INVENTION

In view of the above, the present invention has for its object the provision of a novel device which is designed to effectively eliminate or minimize the reaction moment occurring with change in speed of an engine crankshaft and which is simple in structure giving only a limited level of operational noise.

According to the present invention, there is provided a reaction moment balancing device for engine use which comprises a balance shaft rotatably supported by the crankshaft of the engine in parallel with the engine crankshaft and weighted with a predetermined mass, transmission means including a pair of intermeshing gears having a predetermined gear ratio and respectively mounted on the crankshaft and the balance shaft for operatively interconnecting the two shafts so that the reaction moments exerted on the crankcase by the rotary systems respectively including the crankshaft and the balance shaft balance each other, cushion means associated with said transmission means to absorb shock in transmission between the crankshaft and the balance shaft, and phase-controlling means associated with said transmission means to limit the phase shift occurring between the crankshaft and the balance shaft upon operation of said cushion means within a predetermined range.

The above and other objects, features and advantages of the present invention will become apparent from the following description when taken in conjunction with the accompanying drawings, which illustrates a preferred embodiment of the invention.

DESCRIPTION OF THE PREFERRED EMBODIMENT

Figure 1:
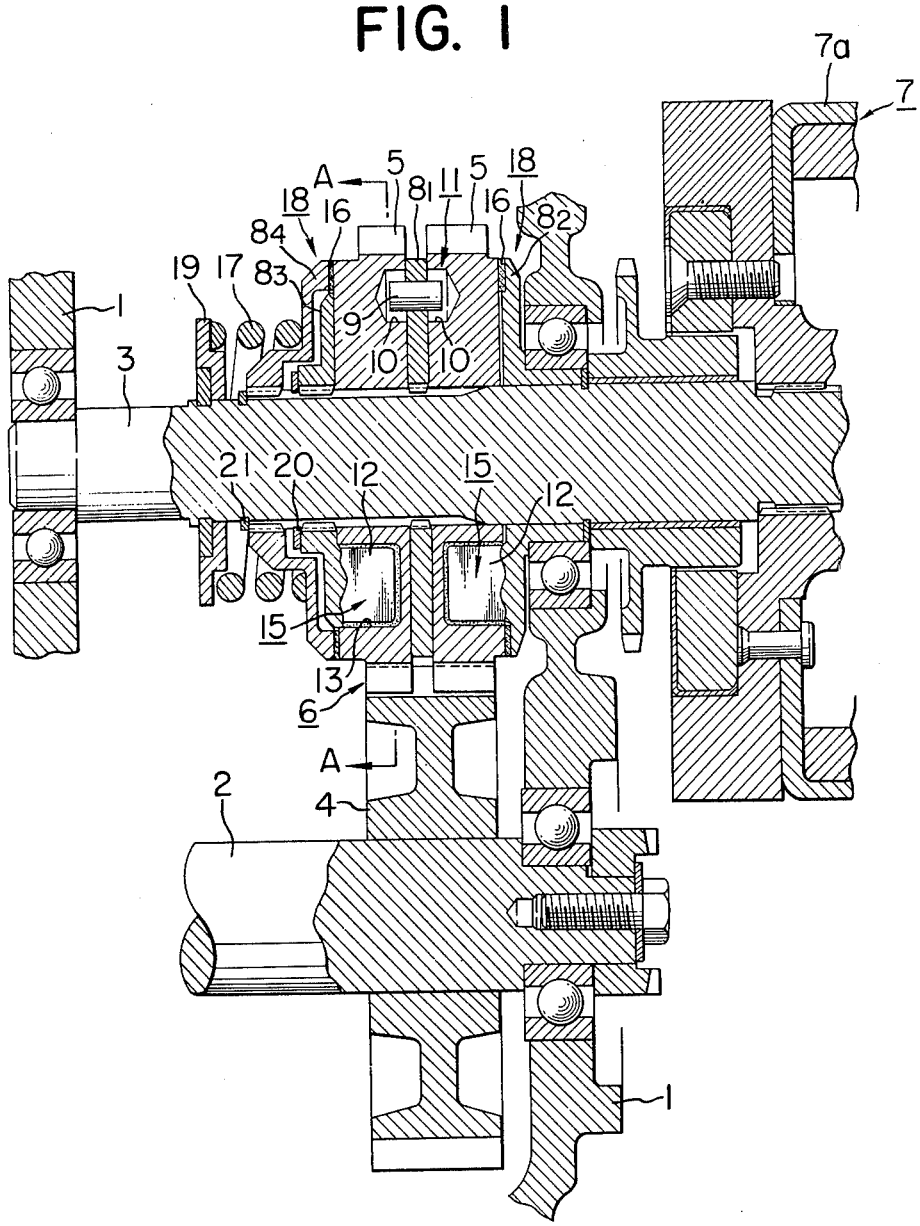
FIG. 1 is a fragmentary plan view, in longitudinal cross section, of a reaction moment balancing device embodying the present invention as applied to a motorcycle engine.

Referring to the drawings and first to FIG. 1, reference numeral 1 designates the crankcase of a motorcycle engine, which rotatably supports the engine crankshaft 2 and a balance shaft 3 in spaced parallel relation to each other. The two shafts 2 and 3 are operatively interconnected by transmission means 6 including a pair of intermeshing driving and driven gears 4 and 5 mounted on the crankshaft 2 and the balance shaft 3, respectively, so that the shafts are rotatable in directions opposite to each other. The balance shaft 3 carries a weighted mass 7a in the form of the rotor of a generator 7, which is of a conventional type used to charge the voltage source of the vehicle.

In design of the device described, the speed ratio between the driving and driven gears 4 and 5 and the mass of weight of rotor 7a mounted on the balance shaft 3 are to be determined so that the reaction moment or the product of moment of inertia and angular acceleration (positive or negative) of the rotary system including the crankshaft 2 balances with that of the rotary system including the balance shaft 3. In the illustrated embodiment, as the moment of inertia of the rotary system including the balance shaft 3 and generator rotor 7a mounted thereon is not sufficient for the balance required with the crankshaft 2 and associated system, the transmission gears 4 and 5 are designed to have an appropriate ratio of speed augmentation therebetween As observed in FIG. 1, the driven gear 5 is of divided form, including a pair of right and left gear sections both mounted on the balance shaft 3 for rotation and axial sliding movement relative thereto with a first transmission disc $8_1$ interposed between the adjacent faces of the two gear sections 5,5 and splined to the balance shaft 3 for axial sliding movement relative thereto. The transmission disc $8_1$ carries a plurality of stop pins 9 arranged on a circle circumferentially at equal intervals and each projecting from the disc $8_1$ axially in opposite directions. On the other hand, the gear sections 5,5 are formed in their faces adjacent to the transmission disc $8_1$ with recessed openings 10 of a diameter larger than that of stop pins 9 for engagement therewith. It is to be understood that the stop pins 9 and recessed openings cooperate to form phase-controlling means effective to limit the phase shift between the transmission disc $8_1$ and the gear sections 5,5 within a predetermined range.

Figure 2:
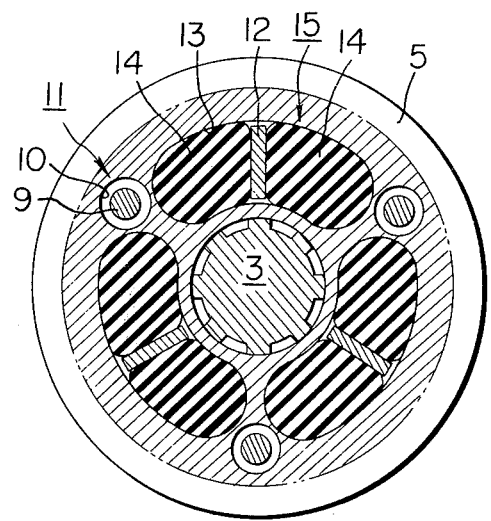
FIG. 2 is a transverse cross-sectional view taken substantially along the line A—A in FIG. 1.

Further, a second transmission disc $8_2$ is forcefitted over the balance shaft 3 on the outside of the right-hand side driven gear section 5 while a third and a fourth transmission disc $8_3$ and $8_4$ are splined to the balance shaft 3 on the outside of the left-hand side driven gear section 5 for axial sliding movement relative to the balance shaft. As shown, the second and third transmission discs $8_2$ and $8_3$ are each formed on the inside face thereof with a plurality of radially extending axial projections 12 arranged on a circle circumferentially at equal intervals. On the other hand, the driven gear sections 5,5 are each formed in its outside face with a corresponding number of arcuate recesses 13 to receive the respective axial projections 12 formed on the adjacent transmission disc $8_2$ or $8_3$. As observed in FIG. 2, a pair of cushion elements 14 formed of rubber or the like material are packed in each of the arcuate recesses 13 together to resiliently hold the radially extending axial projection 12 as received therein. It will be understood that the plurality of axial projections 12 and pairs of cushion elements 14 cooperate to form cushioning means 15 effective to absorb any shock in torque transmission between the associated driven gear section 5 and the second or third transmission disc $8_2$ or $8_3$.

Figure 3:
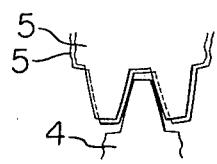
FIG. 3 is a fragmentary enlarged front view schematically illustrating the intermeshing relation of the transmission gears shown in FIG. 1.

In the assembled state of the driven gear 5 including cushioning means 15 associated with the respective gear sections, it will be understood that there normally occurs a more or less phase shift between the right and left driven gear sections 5,5 as illustrated in FIG. 3, because of the manufacturing errors of the component parts of the right and left cushioning means 15,15 and, among others, variations in hardness and finished size of the elastic cushion elements 14. In this manner, the teeth of gear sections 5,5 as placed in mesh with the driving gear 4 are held in close contact with the opposite sides of the adjacent tooth thereof and any backlash between the driving and driven gears 4 and 5 is removed. (The radial shift seen in FIG. 3 between the two gear sections is exaggerated just to make clear their representation and is actually negligibly small.)

Adhesively bonded to the respective inner faces of the second and fourth transmission discs $8_2$ and $8_4$ are annular friction sheets 16 of cork or the like high friction material which are placed in pressure contact with the opposite end faces of the driven gear 5 under the bias of a coiled compression spring 17, which is arranged between the fourth transmission disc $8_4$ and a spring seat 19 mounted on the balance shaft 3 to press the fourth transmission disc $8_4$ against the second transmission disc $8_2$ through the two driven gear sections 5,5 with first transmission disc $8_1$ interposed therebetween. As will readily be understood, the friction sheets 16 and compression spring 17 constitute friction clutch means 18 for frictionally connecting the second and fourth transmission discs $8_2$ and $8_4$ with the respective gear sections 5,5 to permit only transmission therebetween of torques not exceeding a predetermined value. Reference numerals 20 and 21 designate circlips employed to limit axial outward displacement of the third and fourth transmission discs $8_3$ and $8_4$, respectively.

Description will next be made of the operation of the embodiment illustrated.

It is obvious that the crankshaft 2 is accelerated or decelerated in operation with acceleration or deceleration of the engine. As long as the angular acceleration (or deceleration) of the crankshaft 2 is relatively small, its rotation is transmitted directly to the balance shaft 3 through the intermediary of the driving and driven gears 4 and 5 intermeshing with no backlash therebetween and the second and fourth transmission discs $8_2$ and $8_4$, which are frictionally held integral with the respective sections of the driven gear 5, and all the while there is no delay in rise of rotation speed of the balance shaft 3 as compared with that of crankshaft 2. As the result, the rotary systems respectively including the crankshaft 2 and balance shaft 3 exert on the crankcase 1 a pair of reaction moments of the same magnitude and opposite in sense, as designed, not giving rise to any unbalanced moment causing oscillation of the crankcase 1. However, as the angular acceleration of the crankshaft 2 exceeds a definite level, slipping occurs in the friction clutches 18, disengaging the second and fourth transmission discs $8_2$ and $8_4$ from the respective driven gear sections 5,5 and the torque as applied to these gear sections 5,5 by the driving gear 4 is transmitted to the balance shaft 3 through the cushion elements 14, radial projections 12 and the second and third transmission discs $8_2$ and $8_3$, the cushion elements 14 being elastically deformed to absorb any shock in transmission as caused by the sudden rise in velocity of the crankshaft 2. At the same time, the phase shift between the two driven gear sections 5,5, which normally exists as illustrated in FIG. 3, is removed so that the gear sections 5,5 are both driven directly by the driving gear 4 with their teeth coming into driving contact with the same side of tooth of the driving gear 4. In this manner, the impact and pressure of the tooth contact between the two gears 4 and 5 and hence the noise in operation as well as the wear and damage of the tooth surfaces are reduced to a material extent.

On this occasion, any delay in rise in angular velocity of the balance shaft 3 results in a corresponding delay in production of the reaction moment desired of the rotary system including the balance shaft 3. However, as the phase shift between the respective driven gear sections 5,5 and the second and third transmission discs $8_2$ and $8_3$ increases to exceed a definite value, the stop pins 9 on the first transmission disc $8_1$ come into engagement with the wall of the respective recesses 10 formed in the driven gear sections to prevent any further increase in amount of the phase shift and thereafter the torque applied to the driven gear sections 5,5 is transmitted to the balance shaft 3 through the intermediary of stop pins 9 and first transmission disc $8_1$. Therefore, the delay in rise of the angular velocity of the balance shaft 3 is so limited and instantaneous that the resulting delay in occurrence of the reaction moment of the rotary system including the balance shaft 3 is practically negligible, causing substantially no oscillation of the crankcase 1.

Subsequently, as the crankshaft 2, balance shaft 3 and associated parts come to rotate evenly at speeds desired, the right and left driven gear sections 5,5 and the transmission discs $8_1$, $8_2$, $8_3$ and $8_4$ are restored to their normal position relative to each other.

As will readily be appreciated from the foregoing description, according to the present invention, any reaction moment exerted upon an engine crankcase by the crankshaft being accelerated or decelerated can be eliminated or reduced to a material extent by a simple structure including a weighted balance shaft 3 journaled in the crankcase 1 in parallel with the engine crankshaft 2 and transmission means 6 interconnecting the two shafts and including a pair of intermeshing driving and driven gears 4 and 5 of an appropriate gear ratio mounted on the respective shafts. In this manner, according to the present invention, an engine can readily be realized which is free from any substantial rocking moment as acting on its crankcase when the engine is accelerated or decelerated and is thus highly stable in operation, involving no substantial engine oscillation. Such operational feature is highly advantageous particularly with motorcycle engines as it enables the motorcycle to keep its running attitude at all times stable. Moreover, the use of cushioning and phase-controlling means 15 and 11 in combination with the transmission means 6 makes it possible to absorb any mechanical shock in transmission and reduce the level of gearing noise without impairing the responsivity of the balance shaft 3 to change in speed of rotation of the crankshaft 2 to any substantial extent despite of the simplicity in structure of the transmission means principally including a pair of meshing gears 4 and 5. Accordingly, any reduction in responsivity of the balance shaft 3 as resulting from wear of tooth surfaces of the meshing gears is effectively prevented.

According to a further feature of the present invention, friction clutch means 18 are arranged in association with the transmission means 6 to restrain the cushioning means 15 in an inoperative state and thus override the latter as long as the torque transmitted between the crankshaft and the balance shaft remains below a predetermined level. This means a rather high responsivity of the balance shaft 3 when the engine acceleration or deceleration is moderate, loading the transmission means 6 only slightly.

According to a further feature of the present invention, one of the pair of intermeshing gears, 4 or 5, of the transmission means 6 is divided in two sections, both held in mesh with the other gear 5 or 4, and cushioning means 15 are associated with the respective gear sections to give a more or less phase shift therebetween and eliminate any backlash between the gears in mesh and there is no reduction in responsivity of the balance shaft as resulting from such backlash.

According to another feature of the present invention, the balance shaft 3 carries a weight in the form of the rotor 7a of a generator 7 indispensable for engine operation and thus makes the total inertial mass associated with the crankshaft much smaller than that when such weight is prepared for the exclusive use on the balance shaft, and enables the engine to have a high acceleration performance.

Though only one preferred embodiment has been shown and described herein, it will be apparent to those skilled in the art that various changes and modifications can be made without departing from the spirit of the invention or the scope of the appended claims. For example, in the transmission means, the driving gear 4, instead of the driven gear 5, may be divided into two sections and associated with cushioning and phase-control means and friction overdriving means with successful results.

What is claimed is:

1. A reaction moment balancing device for an engine, comprising:
   a balance shaft rotatably supported by the crankcase of the engine in parallel with the engine crankshaft and weighted with a predetermined mass; and
   transmission means including a pair of intermeshing driving and driven gears mounted on the crankshaft and the balance shaft, respectively, and having such a gear ratio that the reaction moments exerted on the crankcase by the rotary systems respectively including the crankshaft and the balance shaft balance with each other;
   said transmission means further including:
   cushioning means for absorbing shock in gear transmission between the crankshaft and the balance shaft; and
   phase-controlling means for limiting the angular phase shift occurring upon operation of said cushioning means within a predetermined range.

2. A balancing device as set forth in claim 1, which further comprises friction clutch means provided for said transmission means to override said cushioning means and arranged to be in engagement without any slip while restraining said cushioning means in an inoperative state as long as the torque transmitted between the crankshaft and the balance shaft remains below a predetermined level.

3. A balancing device as set forth in claim 1, in which either one of said intermeshing gears of said transmission means is divided into two gear sections both held in mesh with the other gear and said cushioning means are arranged between each of said two gear sections and the shaft carrying such gear sections.

4. A balancing device as set forth in claim 1, in which said weight carried on said balance shaft takes the form of the rotor of a generator.

* * * * *